Oct. 3, 1967     L. J. ILINES     3,344,752
POTATO DOUGH EXTRUDER

Filed Dec. 15, 1965     3 Sheets-Sheet 1

INVENTOR:
LAURENCE JAMES ILINES

BY: *Cavanagh & Norman*

Oct. 3, 1967  L. J. ILINES  3,344,752
POTATO DOUGH EXTRUDER
Filed Dec. 15, 1965  3 Sheets-Sheet 2
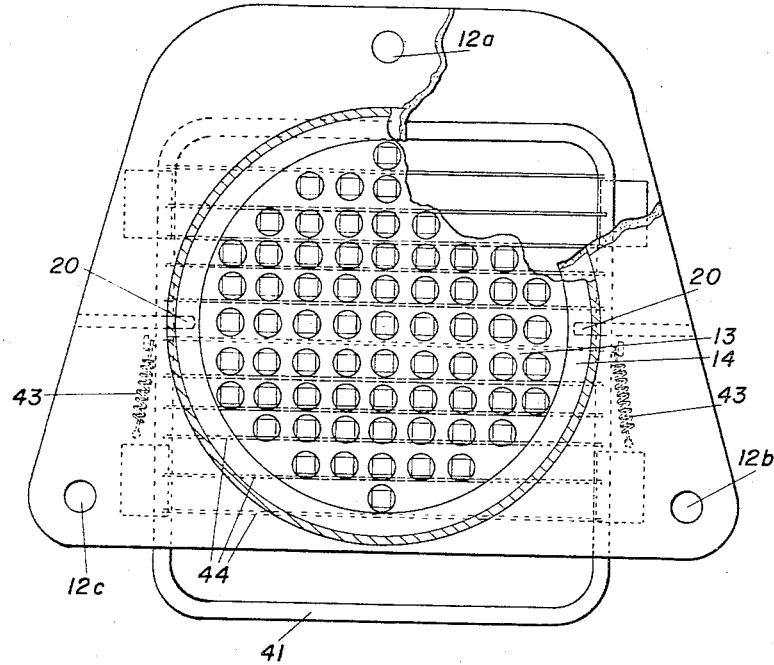
FIG. 2
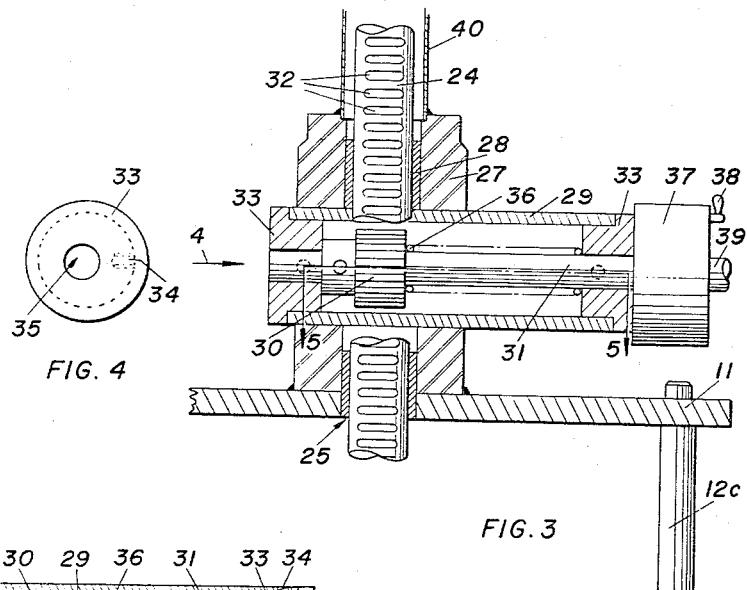
FIG. 4
FIG. 3
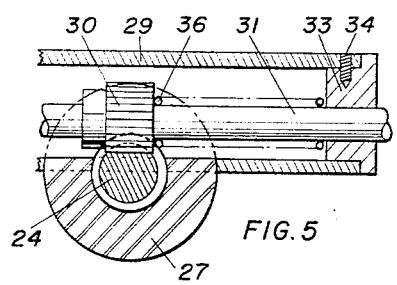
FIG. 5
INVENTOR:
LAURENCE JAMES ILINES
BY: *Cavanagh & Norman*

Oct. 3, 1967  L. J. ILINES  3,344,752
POTATO DOUGH EXTRUDER
Filed Dec. 15, 1965  3 Sheets-Sheet 3
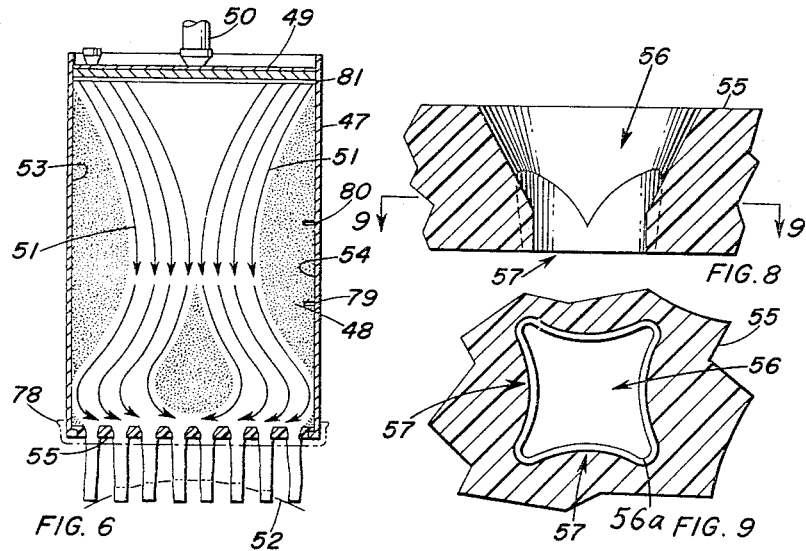
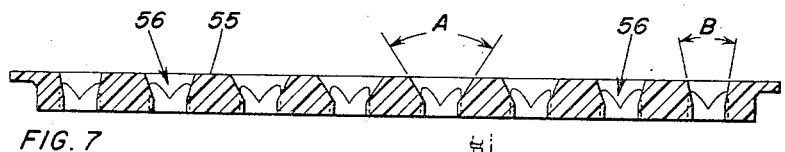
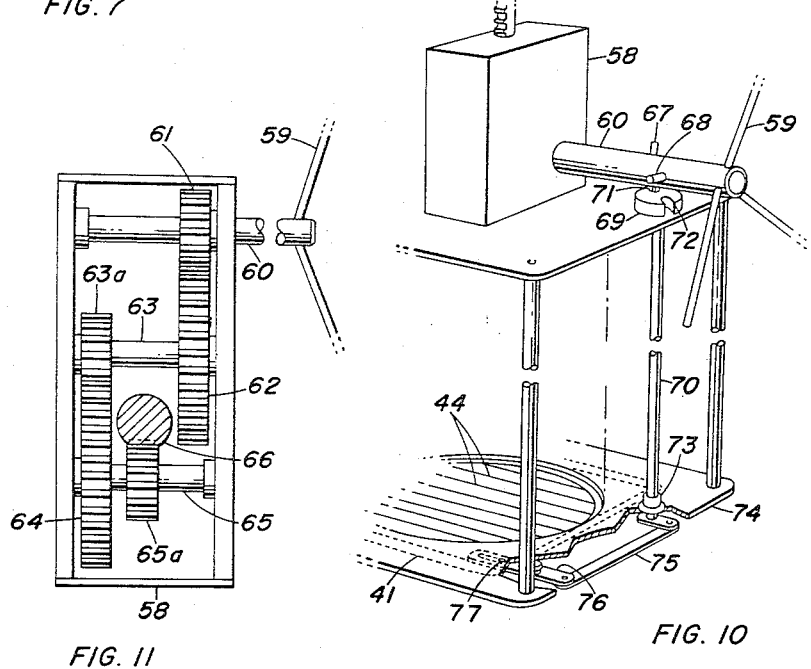
INVENTOR:
LAURENCE J ILINES
BY: Cavanagh & Norman

United States Patent Office 3,344,752
Patented Oct. 3, 1967

3,344,752
POTATO DOUGH EXTRUDER
Laurence James Ilines, 26 Dale Ave., Scarborough,
Ontario, Canada
Filed Dec. 15, 1965, Ser. No. 517,505
8 Claims. (Cl. 107—14)

ABSTRACT OF THE DISCLOSURE

This specification discloses apparatus for forming potato chips with the apparatus comprising: a cylindrical container for dough; an extrusion die secured to the bottom of the container and having a plurality of extrusion openings; a pressure plate movable within the container; and manual means for applying pressure to said pressure plate.

The invention relates to an appliance for extruding potato dough for use in association with other food procesing equipment such as, for example, a deep fryer, and is a continuation in part of my co-pending application Ser. No. 462,239 filed June 8, 1965 entitled, "Potato Dough Extruder" (now abandoned).

The handling of potatoes in the raw state is known to be a highly wasteful procedure both in the home and on a commercial scale, and such waste is particularly aggravated when the potatoes are cut up to make so-called "French fries." The shape of the potato does not lend itself to being divided into strips of square cross-section and a significant portion is wasted. In addition, it is not always possible to make exactly the right quantity, with the result that there is invariably a proportion of either uncooked or cooked potato remaining which is useless and must be thrown away. In addition, raw potatoes do not store for any length of time except under specifically controlled conditions. Accordingly, it has been the practice for many years to dehydrate potatoes and turn them into dry potato flour which can thereafter be mixed with water and milk and turned into mashed potato for eating. This procedure is a much more economical method of dealing with potatoes but has the disadvantage that such mashed potatoes are highly unpalatable, and accordingly, attention has been directed to forming such potato flour into a dough and extruding the dough in rectangular cross-section to form French fried potatoes which are then immediately ready for frying in a deep fryer. However, in order for this procedure to become commercially acceptable on a large scale the equipment used for extruding the dough must be both simple, reliable and easy to clean, in order to gain the acceptance of restaurant owners and commercial institutions.

Such extruders as have been available in the past have been of a highly complicated design rendering them expensive to manufacture and also difficult to maintain in a state of cleanliness required by public authorities. In addition, the operation of such prior machines has been somewhat complex rendering them unsuitable for use by unskilled help. A further disadvantage of such prior machines lies in the fact that the manual pressure applied to extrude the dough in the form of French fries is applied through a handle which must be operated up and down several times to extrude a length of dough sufficient to make one French fry, and it is therefore a matter of some skill and practice to operate such machines in a manner producing the most pleasing and appealing result. In addition, such repeated operations involving intermittent movement through the extrusion die of the machine tends to produce a series of ridges around the French fry which is both unsightly and also makes it readily distinguishable from the natural product. A further disadvantage of such prior machines is the fact that after extrusion of the dough from the extrusion die the rectangular length of dough is cut-off by means of a rotary movement, the engineering of which is troublesome and tends to become clogged with dough impairing its operation, and, in addition, such rotary movement tends to produce a different cutting effect depending upon the distance from the centre of rotation.

It is therefore an objective of the present invention to provide a dough extruding machine which is economical to build, simple to operate, reliable over long periods of time and easy to keep clean.

More particularly, it is an objective of the invention to provide a machine having the foregoing advantages in which the dough is extruded to a length equal to that of a standard French fry with a single manual movement in order to maintain consistency and appearance of the finished product.

More particularly, it is an objective of the invention to provide a machine having the foregoing advantages in which the cutting operation is performed along a reciprocable linear path.

The foregoing and other advantages will become apparent from the following description of a preferred embodiment of the invention which is now given by way of example only with reference to the following drawings in which like reference devices refer to like parts thereof throughout the various views and diagrams, and in which:

FIGURE 2 is a plan view partially in section along the line 2—2 of FIGURE 1 with portions thereof cut-away;

FIGURE 3 is a sectional side elevational along the planes represented by the line 3—3 of FIGURE 1;

FIGURE 4 is an end view in the direction of arrow 4 of FIGURE 3;

FIGURE 5 is a section along the line 5—5 of FIGURE 3;

FIGURE 6 is a mid-vertical section through a tub unit according to the present invention and showing the flow and pressure distribution in the potato dough;

FIGURE 7 is a section through an extrusion die according to this invention;

FIGURE 8 is an enlarged sectional view of a fragment of the die shown in FIGURE 7;

FIGURE 9 is a section along the line 9—9 of FIGURE 8;

FIGURE 10 is a perspective view of a portion of the extruder showing the means for cutting the extruded dough; and FIGURE 11 is a section through the gear box used with the extruder.

Figure 1:
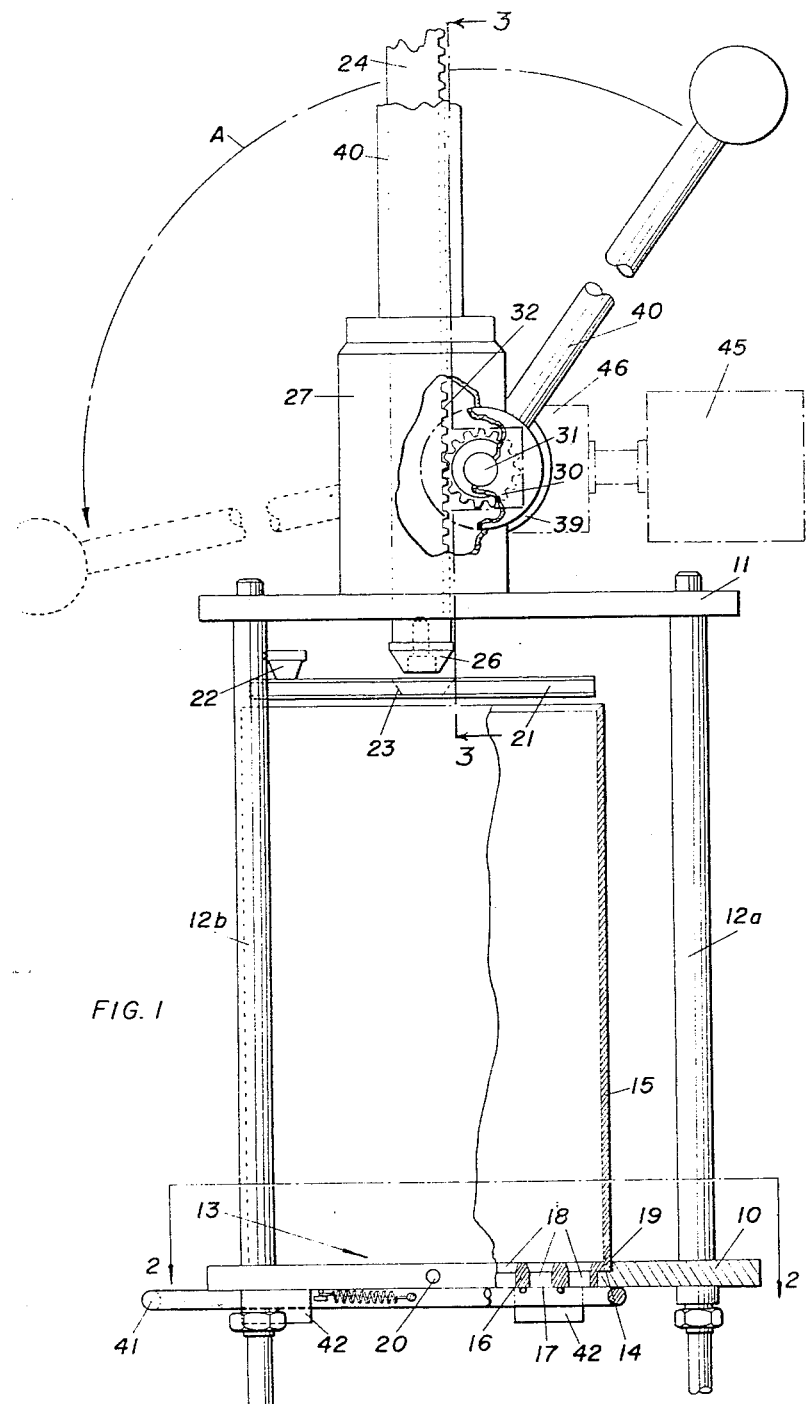
FIGURE 1 is a side elevational view of a machine for extruding potato dough according to the invention with portions thereof cut-away.

The dough extruding machine according to this preferred embodiment of the invention will be seen to comprise a framework consisting of a lower or base plate 10 and a top plate 11 mounted parallel to base plate 10 and spaced vertically thereabove and located and maintained by three spaced pillars or rods 12a, 12b and 12c, rod 12a being at the back of the machine and rods 12b and 12c being across the front of the machine and together defining an access opening therebetween permitting an operator to have unobstructed use of the various parts of the machine to be described, it being noted that plates 10 and 11 are of the same general quadrilateral shape in which the longest side or edge is located towards the front of the machine between the two pillars or rods 12b and 12c thereby permitting relatively wide spacing thereof for access as aforesaid. The lower or base plate 10 is provided with a circular opening indicated by the arrow 13 surrounded by an annular step or ledge 14 which is dimensioned and shaped to fit around and support the lower portion of the cylindrical plastic container or tub 15 therewithin. Tub 15 is provided with an extruding die 16 of thickened cross-section extending across the bottom thereof and provided with a series of extruding orifices or nozzles 17 regularly spaced therein in lines having a square or rectangular cross-section to provide a typical potato chip or French fry. Nozzles 17 are preferably provided with an enlarged circular upper end 18 for easing the flow of potato dough therethrough. Die 16 is provided with a stepped portion or ledge 19 around the periphery thereof fitting over ledge or step 14 on base plate 10 so as to register the same therewithin. Additionally, there is preferably provided one or more register pins 20 extending through the plane of base 10 and part of the way across step 14 thereof mating with corresponding semi-cylindrical shaped recesses in ledge or step 19 formed on die 16 whereby to ensure location of tub 15 and die 16 with nozzles 17 in rows in the desired orientation.

Tub 15 is provided with a circular pressure plate 21 shaped to make a sliding fit therewithin having a handle 22 for removal thereof and a tapered recess 23 located centrally thereof for reception of suitable pressure means.

Pressure is applied to plate 21 by means of the assembly located on the upper side of top plate 11 (see FIGURE 1 and also illustrated in FIGURES 3, 4, and 5). This mechanism will be seen to comprise a vertically slidable pressure rod 24 extending through opening 25 in plate 11 having on its lower end a frusto conical pressure member 26 fitting within tapered recess 23 in plate 21 for forcing the same downwardly and for simultaneously correcting any tendency of plate 21 to become misaligned or tilted in tub 15. A relatively massive vertically oriented bearing member 27 is welded to plate 11 in registration with opening 25 therein and is provided with central bushing 28 for sliding supporting engagement of shaft or rod 24. A side portion of bearing housing 27 is cutaway for access to shaft or rod 24 therewithin and a tubular cylindrical gear housing 29 is welded to bearing housing 27 in registration with opening 25 formed therein and is itself provided with an opening permitting access from housing 29 to the interior of housing 27. Drive pinion or gear 30 is rotatably mounted within housing 29 on drive shaft 31 and makes driving engagement with racking teeth 32 formed along shaft or rod 24 for moving the same up and down. Drive shaft 31 is supported in tubular housing 29 by means of off-set or eccentric bearings 33 fitting within opposite ends of housing 29 and fastened in fixed relation thereto by said screws 34. FIGURES 4 and 5 illustrate the off-set or eccentric construction of bearing 33, bushing holes 35 therein being there shown off centre to a considerably exaggerated extent. In this way, during the assembly operation, drive shaft 31 and drive pinion 30 may be adjusted in various locations so as to produce perfect meshing of pinion 30 with racking teeth 32 by merely rotating bushings 33 relative to housing 29 after which they are fastened in position by said screws as aforesaid. Any suitable braking device such as coil spring 36 is provided around drive shaft 31 for maintaining the same in any desired position.

Drive is applied to drive shaft 31 through the ratchet drive device 37 having reversing handle 38 thereon for applying the ratchet drive in either clockwise or anti-clockwise rotation. Ratchet drive 37 is in turn driven by operating shaft 39 and handle 40 attached thereto. A tubular cover member or shield 40 is welded to the upper end of housing 27 and extends upwardly around shaft or rod 24 for as long as is required to protect and shield the operator's hands.

In order to cut off the potato chips or French fries after they have been extruded through die 16 a cut-off device or shearing means is provided as illustrated in FIGURES 1 and 2. Such shearing means will be seen to comprise the generally rectangularly shaped metallic rod framework 41 the opposite sides of which are spaced apart a distance somewhat in excess of the diameter of die 16 slidably mounted on the underside of base plate 10 by means of nylon or other plastic slide blocks 42 and having return spring means 43 on either side thereof. A series of thin wire cutter members 44 extend across frame 41 in parallel relation spaced apart from one another a distance equal to the spacing between adjacent rows of extrusion nozzles 17. It will be noted that there is one such wire cutter member 44 provided for each separate row of nozzles 17 and that they are located normally between such nozzles 17 so as to permit free extrusion of potato therefrom, inward movement on frame 41 from the front of the machine by the operator causing cutting of all of the extruded lengths of dough simultaneously.

Any suitable collection means may be provided below die 17 such as a conventional chip fryer or basket (not shown) in order that after extrusion and cutting the chips may be simply transferred to the cooking operation with a minimum of handling which would otherwise affect their shaping.

In operation, an operator will operate ratchet handle 38 and move handle member 40 upwardly and downwardly to ratchet rod 24 to its uppermost position out of the interior of tub 15. The operator may then simply reach between posts 12b and 12c and remove tub 15 and fill it with a suitable quantity of dough after which it is replaced in position with die member 16 located within opening 13 in base plate 10 and ledge portion 19 thereof resting upon step portion 14 of base 10, the registering pins 20 being interengaged with the registering recesses (not shown) in ledges 19 as aforesaid. Pressure plate 21 is then placed within tub 15 and the ratchet handle 38 is then reversed and handle member 40 is operated upwardly and downwardly thereby ratcheting rod 24 downwardly and bringing the frusto conical pressure member 26 into recess 23 in plate 21. Downward ratcheting is then continued until a suitable length of dough is extruded from nozzles 17 after which the handle 40 may be left in any position, coil spring 36 holding it in such position and the extruded French fries are then cut-off by inward pressure on frame member 41. The next quantity of French fries is then extruded by simply moving handle 40 to its uppermost position at the extreme end of its stroke after which it is moved forwardly and downwardly as shown by the arrow A (see FIGURE 1) which movement is calculated to extrude a length of dough equal to the average French fry, i.e., somewhere in the region of four inches and the cut-off means are operated again. These operations can be continued until tub 15 is emptied.

According to a further embodiment of the invention provision may be made for power operation of the apparatus. Handle 40 may be dispensed with together with ratchet drive 37, and a reversible electric motor 45, driving through transmission 46 (shown in phantom on FIGURE 1) is attached to drive shaft 31, and controlled by suitable switch means (not shown).

While the foregoing apparatus provides an entirely practical and workable dough extrusion unit, it has been found that restaurant personnel and the general public require greater precision in the production of an acceptable French fry of potato dough. Two basic inaccuracies are encountered. In the first place the length of chips extruded is found to vary across the face of the extrusion die, being greater around the periphery and less, towards the central area. Secondly, the dough, being in a plastic state, exhibits a certain degree of recovery after extrusion so that it loses its perfectly square cross-section. Both of these problems can now be overcome according to the following further embodiments.

Investigations into the flow characteristics during extrusion by the means of a tracer dye revealed the pattern substantially as depicted in FIGURE 6 which thus revealed the variation in pressure and flow across the area of the extrusion die. In order to minimize the effects of pressure variation in the study of pressure distribution across the extrusion die, dyes and other means were employed with the result that higher flow rates and pressures were discovered to exist in the peripheral regions of the extrusion die which resulted in the greater flow rate of the potato chip with subsequent lengthing of these chips in these regions.

With reference to FIGURE 6 a tub 47 contains a quantity of potato dough 48 and is provided with the plunger 49 operable by means of the ram 50 similar to the ram member 26. It will be seen from the flow and pressure distribution lines 51 and 52 that the distribution of pressure and thus flow within the tub 47 during extrusion of the potato dough material is not uniform. Due to friction along the side walls as at 53 and 54, the flow in this region of the dough is somewhat static and therefore there is an increase of flow of velocity towards the centre of the tub 47.

However, at the bottom of the tub in the region of the extrusion die 55 a variation in pressure and a variation in flow takes place whereby the flow rate is somewhat increased towards the periphery of the tub 47 and somewhat decreased towards the centre thereof. It should be noted that the potato dough is a semi-fluid mixture and that under pressure as applied by plunger 49 some liquid properties are enhanced and some of the semi-liquid properties are enhanced whereby characteristic flow patterns and pressure distributions result. Since the variation in length of chips produced would be unsuitable from a marketable product point of view attempts were made to provide an extruder which would produce substantially equal lengths of potato chips.

To overcome these difficulties the lead-ins or entrance areas of the individual holes in the extrusion die 55 were altered as shown in FIGURE 7. In the drawing it will be seen that the lead-in angle indicated by the letter A in FIGURE 7 is somewhat greater than the lead-in angle indicated by the letter B and this variation in the lead-in angle, decreasing towards the periphery is carried out from the centre throughout the whole die to result in a die which will produce potato chips of substantially equal lengths. The increase in the lead-in die angle results in a greater total, net pressure at the exit from the die in the central region with an increase in flow velocity in these areas to compensate for the increased flow distribution in the peripheral regions due to a higher, local pressure.

The problem of the recovery of the square extruded dough is overcome by alteration of the die openings as illustrated in FIGURE 8 and FIGURE 9, wherein the die opening as at 56 is not completely square but is provided with the inwardly formed sides 57 which extrude the potato chips in this form. In addition, the die openings 56 are preferably provided with radiused corners 56a which are completely smooth and free of abrupt changes in shape as would occur between two adjacent sides of a rectangular die opening. In this way feathering or tearing of the edges of the extruded chips is avoided. Upon extrusion of the dough material in chip form and due to release of pressure the soft chip expands in the side region to reform into a chip having a substantially square cross-section, thereby to produce a chip of pleasing appearance and having an appearance closely akin to a potato chip produced from the solid potato.

Thus, by providing an extrusion die with varying inlet angles to the holes therethrough and by providing the sides of the hole formed inwardly to produce a modified square design, dotato chips can be extruded by the device which are similar in appearance and which closely resemble potato chips produced from solid potato. Whereas, it is realized that chips can be suitably produced by resort to the simple form of die shown in FIGURE 1 and FIGURE 2, the type of die as disclosed in FIGURE 6 to 9 is superior for producing acceptable chips at a comparatively high rate such as may normally be encountered in restaurants and other commercial food establishments. Thus, the die 55 as described is to be preferred for such use.

With reference to FIGURE 10 other modifications of the basic design are illustrated wherein a gear box 58 is provided in place of the simple arrangement shown in FIGURE 3, in order that the mechanical advantage afforded by handle 59 can be increased. The gear box 58 is shown in FIGURE 11 wherein an input shaft 60 is provided with a small gear 61 meshing with a larger gear 62 supported on a shaft 63. A second gear 63a secured to the shaft 63 meshes with a larger gear 64 mounted on shaft 65. The gear 65a on shaft 65 is meshed with the rack 66 and by rotation of the shaft 60 the gears cause reciprocable movement of the rack 66 in a manner similar to the rack 24 shown in FIGURE 3.

In order to eliminate separate manual cutting of the extruded chips the cutting mechanism may be mechanically linked to the extruding mechanism. Thus, the extension of shaft 60 is provided with a pair of pins 67 and 68 projecting to both sides through this shaft 60 to alternately mesh with the indexing wheel 69 supported on a vertical shaft 70. The indexing wheel 69 is provided with a pair of slots 71 and 72, whereby upon rotation of the shaft 60 one or the other ends of pins 67 or 68 alternately engage in the slots 71 and 72 to cause oscillation of shaft 70.

The shaft 70 is pivoted at 73 in lower plate 74 and provided with a linkage 75 connected to the pivot arm 76. The pivot arm 76 is provided with a pin 77 secured into the frame 41 supported below plate 74 in a manner similar to the frame 41 shown in FIGURE 1 and FIGURE 2. As before a number of wires 44 are provided on the frame 41 and upon oscillation of shaft 70 the lever arm 76 will oscillate through link 75 to cause a back and forth motion of the frame 41 and thus the wires 44 to effect cutting of the chips at the end of each extrusion stroke. In this manner, more or less continuous rotation of the handle 59 will effect a more or less continuous extrusion of potato chips with the chips being cut at intervals by reciprocation of the cutting wires driven by means of the indexing wheel 69. Thus by one operation, that is by turning of the handle, a quantity of potato chips can be extruded from the device, each chip being similar to the others and providing a chip when cooked of appearance closely akin to chips produced from solid potatoes.

In many cases it is preferable to mix the powdered potato with water in the extrusion chamber itself. Thus, in particular circumstances the potato dough can be provided within the chamber without the necessity for pre-mixing the dough and transferring into the container. It has been found that such a method provides the dough ready for extrusion without the necessity of transferring from one container to another, such transferring often being difficult due to the comparatively stiff nature of the dough mix.

One method found satisfactory is to provide a removable cap 78 which can be secured over the extrusion die on the bottom of the tub, after which the water can be poured into the tub up to the index mark as at 79. The required amount of potato powder can then be added to the tub, this amount being premeasured or being determined from a second index mark 80 on the side of tub 47. Upon the dough mixture being evenly mixed within the tub, cap 78 can be removed and the plate or plunger 49 is replaced in the top of the tub 47 to operate as aforesaid.

It has also been found that during use of the apparatus as described, it is often difficult to remove the plunger 49 from within the tub 47 due to the rather adhesive nature of the potato dough. In order to overcome this difficulty a pressure relief pad 81 being of a configuration to match the plate 49 is installed thereunder between plate 49 and the dough mixture. By resort to this device it is found that the plunger 49 can be removed from within the tub 47, whereafter the pad 81 can be removed in order that additional dough mixture can be added or that the mixture within the tub can be removed. One material found suitable for pressure relief pad 81 is a sheet of polyethylene plastic, this plastic being suitable for the purpose and also of such a nature as to be kept hygienic.

The foregoing is a description of the preferred embodiment of the invention which is here made by way of example only. The invention is not to be construed as limited to any of the specific features described but comprehends all such variations as come within the spirit and scope of the appended claims.

What I claim is:

1. Apparatus for forming potato chips by extrusion of potato dough and comprising: a cylindrical container for said dough; an extrusion die secured to one end of said container, said die defining a plurality of extrusion holes therethrough; lead-in means about each said extrusion hole, having an included angle of magnitude decreasing toward the peripheral edge of said die; a pressure plate member operable within said container; and manual pressure means operable to apply pressure to said pressure plate, whereby the dough is extruded through said die to provide potato chips, said lead-ins providing chips of uniform length.

2. Apparatus as claimed in claim 1, including a pressure relief pad within said container and subjacent the underside of said pressure plate member, whereby the potato dough is prevented from sticking to said plate member.

3. Apparatus as claimed in claim 1, including a cap removably secured over said extrusion die thereby to cover said holes, whereby said container can be used to mix the potato dough.

4. Apparatus as claimed in claim 1, wherein said manual pressure means comprises: upper and lower frame plate means; rod frame means extending between said plate means fastening same together in spaced relation to define an access opening to hold said container; and a gear box mounted on said upper plate means and including a ram operable to apply pressure to said pressure plate member, said gear box including a manually operable handle, to provide said pressure.

5. Apparatus as claimed in claim 1, including a cutter frame assembly slidably supported below said die; wire cutter members extending across said cutter frame parallel to one another and with said extrusion holes, spaced apart a distance substantially equal to the spacing between said rows thereof; and linkage means operable with said manual pressure means to reciprocate said cutter frame and cut the extruded dough into chips.

6. Apparatus as claimed in claim 1, wherein said extrusion holes are of a generally square cross-section and have inwardly formed sides and with radiused corners, thereby to provide on extrusion a potato chip similar to one cut from solid potato.

7. The apparatus of claim 1 together with a pressure relief pad in the form of a sheet of polyethylene plastic within the container on the underside of the pressure plate to prevent dough from sticking to said plate member.

8. The apparatus of claim 1 together with a cutter frame assembly slidably supported below said die; wire cutter members extending across said cutter frame parallel to one another and with said extrusion holes, said wire cutter members being spaced apart a distance substantially equal to the spacing of the rows of said extrusion holes, linkage means operably connected to said manual pressure means to reciprocate said cutter frame and cut the extruded dough into chips; and bearing blocks fastened to said lower plate member on the underside thereto to support said cutter frame assembly.

References Cited

UNITED STATES PATENTS

| | | | |
|---|---|---|---|
| 409,734 | 8/1889 | Criley | 18—12 |
| 883,263 | 3/1908 | Wessel | 25—12 |
| 1,405,049 | 1/1922 | Leister | 18—12 |
| 1,955,342 | 4/1934 | Pizzini et al. | 107—14 |
| 2,351,493 | 6/1944 | Curry | 107—14 |
| 2,820,423 | 1/1958 | Catuccio | 107—14 |
| 2,974,613 | 3/1961 | Maldari | 107—14 |
| 2,994,106 | 8/1961 | Posey | 18—12 |
| 3,215,094 | 11/1965 | Oldershaw et al. | 107—1 X |

FOREIGN PATENTS

| | | |
|---|---|---|
| 838,050 | 11/1938 | France. |
| 464,613 | 7/1951 | Italy. |

BILLY J. WILHITE, *Primary Examiner.*